US005800799A

United States Patent [19]
Pinnavaia et al.

[11] Patent Number: 5,800,799
[45] Date of Patent: *Sep. 1, 1998

[54] POROUS INORGANIC OXIDE MATERIALS PREPARED BY NON-IONIC SURFACTANT AND FLUORIDE ION

[75] Inventors: Thomas J. Pinnavaia, East Lansing, Mich.; Eric P. Prouzet, Lorient, France

[73] Assignee: Board of Trustees operating Michigan State University, East Lansing, Mich.

[*] Notice: The term of this patent shall not extend beyond the expiration date of Pat. No. 5,622,684.

[21] Appl. No.: 641,802

[22] Filed: May 2, 1996

[51] Int. Cl.$^6$ ................................................. C01B 39/04
[52] U.S. Cl. .................. 423/702; 423/703; 423/705; 423/713; 423/718
[58] Field of Search ........................ 423/701, 702, 423/703, 704, 705, 706, 718, 713, 332, 333

[56] References Cited

U.S. PATENT DOCUMENTS

| | | |
|---|---|---|
| 3,702,886 | 11/1972 | Argauer et al. |
| 3,709,979 | 1/1973 | Chu. |
| 4,108,881 | 8/1978 | Rollmann et al. |
| 4,151,189 | 4/1979 | Rubin et al. |
| 4,391,785 | 7/1983 | Rosinski et al. |
| 5,098,684 | 3/1992 | Kresge et al. |
| 5,102,643 | 4/1992 | Kresge et al. |
| 5,143,879 | 9/1992 | Whitehurst. |
| 5,300,277 | 4/1994 | Kresge et al. ................. 423/703 |
| 5,308,602 | 5/1994 | Calabro et al. ................ 423/705 |
| 5,320,822 | 6/1994 | Ozin et al. .................... 423/705 |
| 5,334,368 | 8/1994 | Beck et al. .................... 423/705 |
| 5,350,722 | 9/1994 | Joly et al. ..................... 502/64 |
| 5,622,684 | 4/1997 | Pinnavaia et al. ............. 423/702 |

FOREIGN PATENT DOCUMENTS 286522  1/1991  Germany.

OTHER PUBLICATIONS

Breck, D. W., Zeolite Molecular Sieves: Structure, Chemistry and Use; Wiley and Sons; London pp. 1 to 100 (1974) No Month.
Meier, et al., Atlas of Zeolite Structure types, Butterworth, London, pp. 451 to 469 (1992) No Month.
Barrer, et al., Zeolites, vol. 1, 130–140 (1981) Oct.
Lok, et al., Zeolites, vol. 3, 282–291 (1983) Oct.
Davis, et al., Chem Mater., vol. 4, 756–768 (1992) No Month.
Gies et al., Zeolites, vol. 12, 42–49 (1992) Jan.
Hearmon et al, Zeolites, vol. 10, 608–611 (1990 Jul./Aug.
Davis, et al., Nature, vol. 331, 698–699 (1988) No Month.
Estermann, M. et al., Nature, vol. 352, 320–323 (1991) Jul.
Thomas, J. M., et al., J. Chem. Soc. Chem. Commun., 875–876 (1992) No Month.
Soghmonian et al., Agnew. Chem. Int. Ed. Engl., vol. 32, 610–611 (1993) No Month.
Beck, et al., J. Am. Chem. Soc., vol. 114, 10834–10843 (1992) No Month.
Coustel, et al., J. Chem. Soc. Chem. Commun., 967–968 (1994) No Month.
Chavin et al., J. Catal., vol. 111: 94–105 (1988) No Month.
Sing et al., Pure Appl. Chem., vol. 57: 603–619 (1985) No Month.

*Primary Examiner*—Mark L. Bell
*Assistant Examiner*—Louis M. Troilo
*Attorney, Agent, or Firm*—Ian C. McLeod

[57] ABSTRACT

A method for the preparation of new quasi-crystalline, porous inorganic oxide compositions formed in the presence of fluoride ion possessing a disordered assembly of worm-like channels. The method uses an interaction between various nonionic polyethylene oxide based surfactants (N°) and neutral inorganic oxide precursors (I°) in an aqueous solution and then the formation of dispersed particles in the aqueous solution in the presence of fluoride. This (N° I° F⁻) templating approach introduces several new concepts to mesostructure synthesis. The application of the low-cost, non-toxic and biodegradable surfactants and ambient reaction temperatures, introduces environmentally clean synthetic techniques to the formation of mesostructures. Recovery of the template can be achieved through solvent extraction where the solvent may be water or ethanol.

48 Claims, 16 Drawing Sheets

POROUS INORGANIC OXIDE MATERIALS PREPARED BY NON-IONIC SURFACTANT AND FLUORIDE ION

BACKGROUND OF INVENTION

1. Field of Invention

This invention relates to the synthesis of crystalline, porous inorganic oxide materials containing a fluoride ion ($F^-$) possessing a disordered assembly of worm-like channels. In particular, the present invention relates to such materials where the formation of the mesoporous structure is accomplished by providing aqueous or alcoholic emulsions of various nonionic polyethylene oxide based surfactants ($N°$) and various neutral inorganic oxide precursors ($I°$) followed by reaction with fluoride ion. This is followed by shaking at ambient reaction temperatures and separation of the dispersed solid product from the solution. This ($N°I°$) templating approach allows for each of removal of template through calcination or solvent extraction which lowers material and energy costs. The template is biodegradable. The ($N°I°$) templating approach also affords non-lamellar mesostructures of metal oxides in addition to silica.

2. Description of Prior Art

Modern human activities rely greatly upon porous solids of both natural and synthetic design. The pore structures of such solids are generally formed during crystallization or during subsequent treatments. These solid materials are classified depending upon their predominant pore sizes: (i) microporous, with pore sizes <1.0 nm; (ii) macroporous, with pore sizes exceeding 50.0 nm; and mesoporous, with pore sizes intermediate between 1.0 and 50.0 nm. Macroporous solids find limited use as adsorbents or catalysts owing to their low surface areas and large non-uniform pores. Micro- and mesoporous solids however, are widely utilized in adsorption, separation technologies and catalysis. There is an ever increasing demand for new, highly stable well defined mesoporous materials because of the need for ever higher accessible surface areas and pore volumes in order that various chemical processes may be made more efficient or indeed, accomplished at all.

Porous materials may be structurally amorphous, paracrystalline or crystalline. Amorphous materials, such as silica gel or alumina gel, do not possess long range crystallographic order, whereas para-crystalline solids such as γ- or η- alumina are semi-ordered, producing broad X-ray diffraction peaks. Both of these classes of materials exhibit very broad pore distributions predominantly in the mesoporous range. This wide pore distribution however, limits the effectiveness of catalysts, adsorbents and ion-exchange systems prepared from such materials.

Zeolites and some related molecular sieves such as; alumino-phosphates and pillar interlayered clays, possess rigorously uniform pore sizes. Zeolites are highly crystalline microporous aluminosilicates where the lattice of the material is composed of $IO_4$ tetrahedra (I=Al, Si) linked by sharing the apical oxygen atoms. Cavities and connecting channels of uniform size form the pore structures which are confined within the specially oriented $IO_4$ tetrahedra (Breck, D. W., *Zeolite Molecular Sieves: Structure, Chemistry and Use*; Wiley and Sons; London, pages 1 to 100 (1974)). Zeolites are considered as a subclass of molecular sieves owing to their ability to discriminate small molecules and perform chemistry upon them. Molecular sieves in general are materials with crystalline frameworks in which tetrahedral Si and/or Al atoms of a zeolite or zeolitic lattice are entirely or in part substituted by other atoms such as B, Ga, Ge, Ti, Zr, V, Fe or P. Negative charge is created in the zeolite framework by the isomorphous substitution of $Si^{4+}$ ions by $Al^{3+}$ or similar ions. In natural zeolites, this charge is balanced by the incorporation of exchangeable alkali or alkaline earth cations such as $Na^+$, $K^+$, $Ca^{2+}$. Synthetic zeolites utilize these and other cations such as quaternary ammonium cations and protons as charge balancing ions. Zeolites and molecular sieves are generally prepared from aluminosilicate or phosphate gels under hydrothermal reaction conditions. Their crystallization, according to the hereafter discussed prior art, is accomplished through prolonged reaction in an autoclave for 1–50 days and oftentimes, in the presence of structure directing agents (templates). The correct selection of template is of paramount importance to the preparation of a desired framework and pore network. A wide variety of organic molecules or assemblies of organic molecules with one or more functional groups are known in the prior art to provide more than 85 different molecular sieve framework structures. (Meier et al., *Atlas of Zeolite Structure types*, Butterworth, London, pages 451 to 469 (1992)).

Recent reviews on the use of templates and the corresponding structures produced, as well as the mechanisms of structure direction have been produced by Barrer et al., *Zeolites*, Vol. 1, 130–140, (1981); Lok et al., *Zeolites*, Vol. 3, 282–291, (1983); Davis et al., *Chem Mater.*, Vol. 4, 756–768, (1992) and Gies et al., *Zeolites*, Vol 12, 42–49, (1992). For example, U.S. Pat. No. 3,702,886 teaches that an aluminosilicate gel (with high Si/Al ratio) crystallized in the presence of quaternary tetrapropyl ammonium hydroxide template to produce zeolite ZSM-5. Other publications teach the use of different organic templating agents and include; U.S. Pat. No. 3,709,979, wherein quaternary cations such as tetrabutyl ammonium or tetrabutyl phosphonium ions crystallize ZSM-11 and U.S. Pat. No. 4,391,785 demonstrates the preparation of ZSM-12 in the presence of tetraethyl ammonium cations. Other prior art teaches that primary amines such as propylamine and i-propylamine (U.S. Pat. No. 4,151,189), and diamines such as diaminopentane, diaminohexane and diaminododecane (U.S. Pat. No. 4,108,881) also direct the synthesis of ZSM-5 type structure. Hearmon et al (*Zeolites*, Vol. 10, 608–611, (1990)) however, point out that the protonated form of the template molecule is most likely responsible for the framework assembly.

In summary, most of the zeolites and molecular sieve frameworks taught in the prior art are assembled by using quaternary ammonium cations or protonated forms of amines and diamines as templates.

The need for new and useful types of stable frameworks and the need to expand the uniform pore size into the mesopore region allowing the adsorption and discrimination of much larger molecules, has driven the search for organic structure-directing agents that will produce these new structures. In the prior art however, molecular sieves possess uniform pore sizes in the microporous range. These pore sizes and therefore the molecular sieving abilities of the materials are predetermined by the thermodynamically favored formation of framework windows containing 8, 10 and 12 I-atom rings. The largest pore size zeolites previously available were the naturally occurring faujasite (pore size 0.74 nm) or synthetic faujasite analogs, zeolites X and Y with 0.8 nm pore windows (Breck, D. W., *Zeolite Molecular Sieves: Structure, Chemistry and Use*; Wiley and Sons; London, pages 1 to 100 (1974)). The innovative use of aluminophosphate gels has allowed the synthesis of new large pore materials. Thus, an 18 I-atom ring aluminophosphate molecular sieve; VPI-5 (Davis et al., *Nature*, Vol. 331, 698–699, (1988)) was produced and found to consist of an hexagonal arrangement of one dimensional channels (pores) of diameter≈1.2 nm. A gallophosphate molecular sieve cloverite, with pore size of 1.3 nm was reported by Estermann M. et al (*Nature*, Vol 352, 320–323, (1991)), while recently, Thomas J. M. et al (*J. Chem. Soc. Chem. Commun.*, 875–876, (1992)) reported a triethyl ammonium cation directed synthesis of a novel 20 I-atom ring aluminophosphate molecular sieve (JDF-20), with uniform pore size of 1.45 nm (calculated from lattice parameters). A vanadium phosphate material was very recently reported with 1.84 nm lattice cavity (Soghmonian et al., *Agnew. Chem. Int. Ed. Engl.*, Vol. 32, 610–611, (1993)). However, the true pore sizes of the latter two materials are unknown since sorption data were not made available and furthermore, these materials are not thermally stable.

In summary, in spite of significant progress made toward the preparation of large pore size materials, thermally stable molecular sieves are still only available with uniform pore sizes in the microporous range.

A recent breakthrough in the preparation of mesoporous silica and aluminosilicate molecular sieves was disclosed in U.S. Pat. Nos. 5,098,684; 5,102,643. The class of mesoporous materials (denoted as M41S) claimed in this prior art was found to possess uniform and adjustable pore size in the range 1.3–10.0 nm. These materials exhibited framework wall thickness from 0.8 to 1.2 nm and elementary particle size generally greater than 50.0 nm. By varying the synthesis conditions, M41S materials with hexagonal (MCM-41), cubic (MCM-48) or layered morphologies have been disclosed (Beck et al., *J. Am. Chem. Soc.*, Vol. 114, 10834–10843, (1992)). The mechanism proposed for the formation of these materials involves strong electrostatic interactions and ion pairing between long chain quaternary alkyl ammonium cations, as structure directing agents, and anionic silicate oligomer species (U.S. Pat. No. 5,098,684). Recently, Stucky et al (*Nature*, Vol. 368, 317–321 (1994)) extended this assembly approach by proposing four complementary synthesis pathways. The direct co-condensation of anionic inorganic species ($I^-$) with a cationic surfactant ($S^+$) to give assembled ion pairs ($S^+ I^-$), for example MCM-41, was described as Pathway 1. The charge reversed situation with an anionic template ($S^-$) being used to direct the assembly of cationic inorganic species ($I^+$) to ion pairs ($S^-$, $I^+$) was Pathway 2. Hexagonal iron and lead oxide and lamellar lead and aluminum oxide phases have been reported using Pathway 2 (Stucky et al. ibid.). Pathways 3 and 4 involve the mediation of assemblies of surfactants and inorganic species of similar charge by oppositely charged counterions ($X^- = Cl^-$, $Br^-$, or $M^+ = Na^+$, $K^+$). The viability of Pathway 3 was demonstrated by the synthesis of hexagonal MCM-41 using a quaternary alkyl ammonium cation template under strongly acidic conditions (5–10 mol $L^{-1}$ HCl or HBr) in order to generate and assemble positively charged framework precursors (Stucky et al. ibid). Pathway 4 was demonstrated by the condensation of anionic aluminate species with an anionic template ($C_{12}H_{25}OPO_3^-$) via alkali cation mediated ($Na^+$, $K^+$) ion pairing, to produce a lamellar $Al(OH)_3$ phase. Pinnavaia et al. (*Nature*, Vol 368, 321–323, (1994)) reported the preparation of a templated mesoporous silica and a Ti-substituted analogue by the acid catalyzed hydrolysis of an inorganic alkoxide precursor in the presence of primary ammonium ions.

All of the aforementioned synthetic pathways involve charge matching between ionic organic directing agents and ionic inorganic precursors. The template therefore, is strongly bound to the charged framework and difficult to recover. For example, in the original Mobil patent (U.S. Pat. No. 5,098,684) the template was not recovered, but burned off by calcination at elevated temperature. Template removal of anionic surfactant (Pathway 2) has however, been demonstrated by ion-exchange with low pH acidic cation donor solutions (U.S. Pat. No. 5,143,879). Template-halide pairs in the framework of acidic Pathway 3 materials can be displaced by ethanol extraction (Stucky et al. ibid). Thus, ionic template recovery is possible, provided that exchange ions or ion pairs are present during the extraction process.

Most recently, the formation of mesoporous molecular sieves via a new route (Pathway 5) was proposed by Pinnavaia et al. (*Science*, Vol. 267, 865–867, (1995)). In this method, the self assembly of micelles of neutral primary amines ($S^\circ$) and neutral inorganic alkoxide precursors ($I^\circ$) was based upon hydrogen bonding between the two components. The new approach ($S^\circ$, $I^\circ$) taught in that prior art afforded mesostructures with greater wall thicknesses, smaller particle sizes and complimentary framework-confined mesoporosities relative to Pathway 1 and 3 materials. The new materials however, provided several advantages over the materials taught in the prior art. Greater wall thicknesses are desired in order that the thermal and hydrothermal stabilities of the materials may be improved (Coustel et al., *J. Chem. Soc. Chem. Commun.*, 967–968, (1994)). Small particle sizes allow for greater volumes of textural mesoporosity in turn leading to greater access, via mass transport through the textural pores, to the framework-confined pores, thereby improving the overall performance of the adsorbent (Pinnavaia et al., ibid; Chavin et al., *J. Catal.*, Vol. 111, 94–105, (1988)). In addition, owing to the weak template-framework interactions, Pathway 5 allowed for the facile solvent extraction of the template, removing the need for cation donors or ion pairs.

The terms framework-confined and textural porosity are herein defined. Framework-confined uniform pores are pores formed by the nucleation and crystallization of the framework elementary particles and are typically highly regular cavities and channels confined by the solid framework. The size of these cavities and channels is predetermined by the thermodynamically favored assembly routes. Textural porosity is that which can be attributed to voids and channels between elementary particles and/or aggregates of such particles (grains). Each elementary particle in the case of molecular sieves is composed of a certain number of framework unit cells each in turn containing framework-confined uniform pores. Textural porosity is formed during crystal growth and segregation or during subsequent thermal treatment or acid leaching. The size of the textural pores is determined by the size, shape and the number of interfacial contacts of these particles or aggregates. Thus, the size of the textural pores is generally one or two orders of magnitude larger than that of the framework-confined pores and is proportional to the elementary particle size.

One skilled in the arts of powder X-ray diffraction (XRD), Scanning Electron Microscopy (SEM), Transmission Electron Microscopy (TEM) and adsorption/desorption can determine the existence of and differentiate between framework-confined and textural mesoporosities. The crystallographic distance between repeat units in the elementary particles and some information about the arrangement of such repeat units can be obtained from XRD. Particle sizes and shapes and preliminary information regarding textural mesoporosity can be established by SEM and TEM. Analysis of the $N_2$ or Ar adsorption-desorption isotherms of the solid material can indicate both framework-confined and textural mesoporosities. Textural mesoporosity is evidenced by the presence of a Type IV isotherm exhibiting a well defined hysteresis loop in the relative pressure region $P_f/P_0>0.5$ (Sing et al., *Pure Appl. Chem.*, Vol. 57, 603–619, (1985)). This behavior is common for a variety of para-crystalline materials and freeze-dried pillared layered solids. Framework-confined mesoporosity is characterized by a sharp adsorption uptake followed by a step in the 0.2–0.7 $P_f/P_0$ region. This step corresponds to filling of the framework-confined mesopores. In MCM-41 materials, the large particle size precludes the formation of textural mesoporosity and a corresponding ratio of textural to framework-confined mesoporosity approaching zero is calculated. In materials prepared via Pathway 5, the elementary particle size was smaller (<40.0 nm) producing a ratio of textural to framework-confined mesoporosity greater than 0.2.

In summary, according to the prior art, the molecular sieve materials and preparation techniques provide several distinct disadvantages and advantages:

i) The prior art of Pathways 1 through 4 teaches the use of charged surfactant species as templates in order to assemble inorganic frameworks from charged inorganic precursors. These charged templates are generally expensive, strongly bound to the inorganic framework and therefore difficult to recover. Additionally, many of these templates such as the most commonly used quaternary ammonium cations are highly toxic and environmentally undesirable. In the prior art of Pathways 1 to 4, the template was removed from the structure by either calcining it out or by ion-exchange reactions. Pathway 5 prior art templates are also highly toxic and environmentally unsuitable, but may be removed through environmentally benign ethanol extraction and thereby recovered and reused.

ii) Prior art mesoporous molecular sieves produced by Pathways 1–4 exhibit small pore-wall thicknesses (0.8–1.2 nm), to which may be related the very poor thermal and hydrolytic stabilities of the materials taught in that prior art, while Pathway 5 provides materials with greater wall thicknesses (2.0 nm) and thereby greater stabilities. This contrast is ascribed to the differences in the self-assembly mechanisms with the former prior art relying on strong ionic interactions and the latter relying on weaker H-bonding interactions.

iii) The prior art of Pathways 1–4 produces materials with low textural to framework-confined mesopore ratios, while the prior art of pathway 5 exhibits higher textural to framework-confined mesopore ratios and therefore, theoretically better access to the framework pores. However, the very small elementary particle size means that few pores are contained within any one particle, thereby theoretically producing lower specific activities.

The need for new methods of preparation of new materials of these types, cost reductions, ease of recoverability and environmental compatibility in the template and inorganic precursors has lead to the development of a new synthetic method to be described herein.

OBJECTS OF THE INVENTION

It is therefore an object of the present invention to provide a new approach to the design and synthesis of crystalline inorganic oxide compositions with a disordered assembly of worm-like channels. Further, it is an object of the present invention to provide inexpensive templates, precursors and methods while avoiding high energy demanding and costly hydrothermal syntheses. Further, it is an object of the present invention to provide a template system that allows for facile recovery and thereby recycling of the template from the condensed inorganic structure via solvent extraction. Further, it is an object of the present invention to provide a template system that affords mesoporous materials through lower cost, lower toxicity than either quaternary ammonium or amine surfactants and template biodegradability. Finally, it is an object of the present invention to provide for the preparation of non-layered inorganic oxide materials derived from metals other than silicon, that are not accessible through the prior art. These and other objects will become increasingly apparent by reference to the following description and the drawings.

DESCRIPTION OF PREFERRED EMBODIMENTS

Figure 1A:
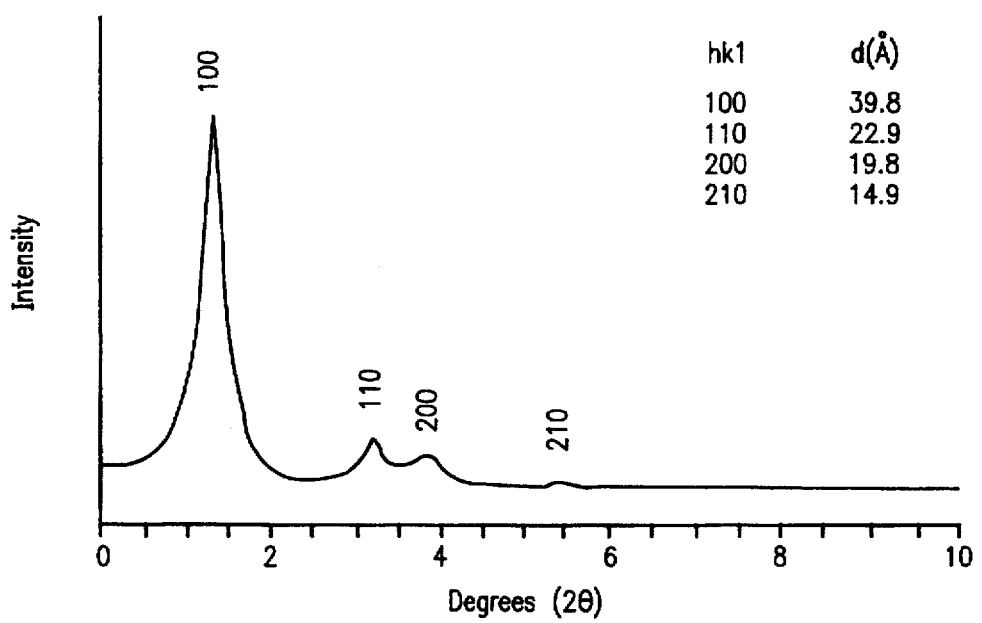
FIGS. 1A and 1B are graphs showing representative X-ray powder diffraction patterns of MCM-41 (FIG. 1A) Beck et al., *J. Am. Chem. Soc.*, Vol. 114, 10834–10843, (1992) and HMS (FIG. 1B) Pinnavaia et al. (*Science*, Vol. 267, 865–867, (1995) products.
Figure 1B:
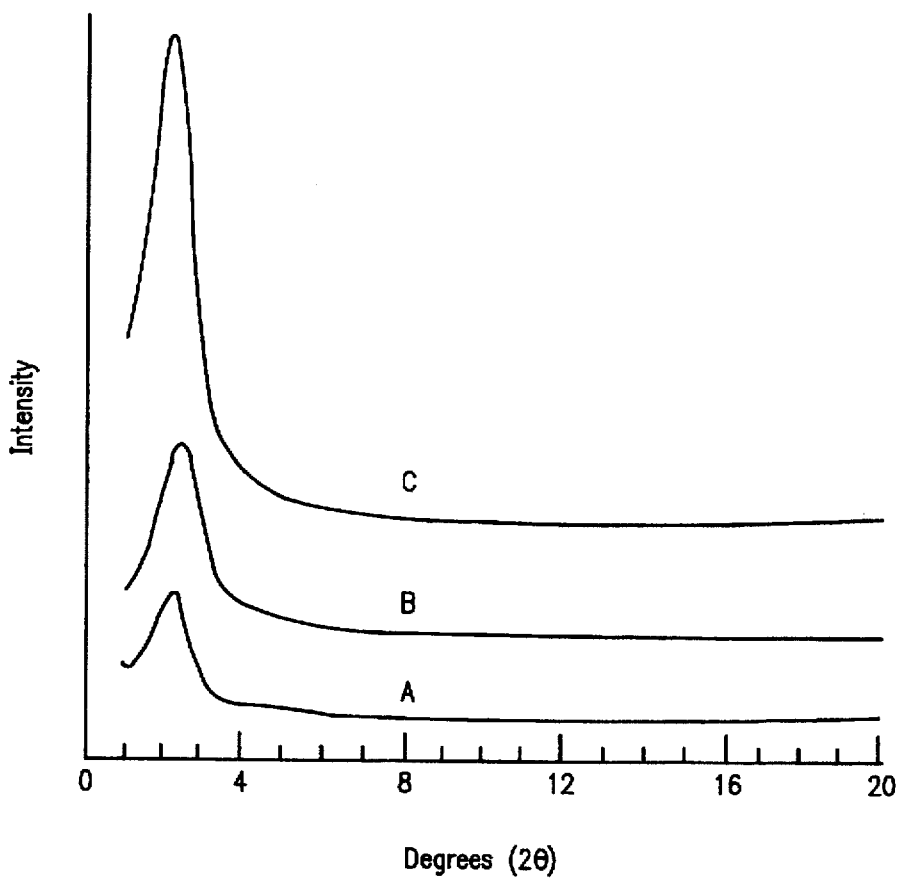
Figure 2A:
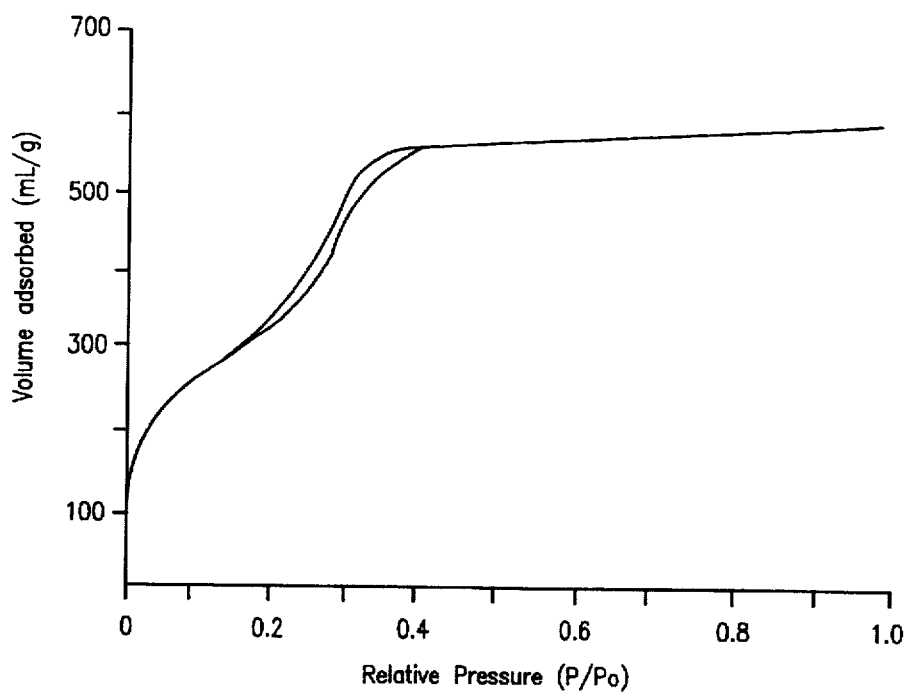
FIGS. 2A and 2B are graphs showing representative $N_2$ adsorption-desorption isotherm for MCM-41 (FIG. 2A) Beck et al., *J. Am. Chem. Soc.*, Vol. 114, 10834–10843, (1992) and HMS (FIG. 2B) Pinnavaia et al. (*Science*, Vol. 267, 865–867, (1995) products.
Figure 2B:
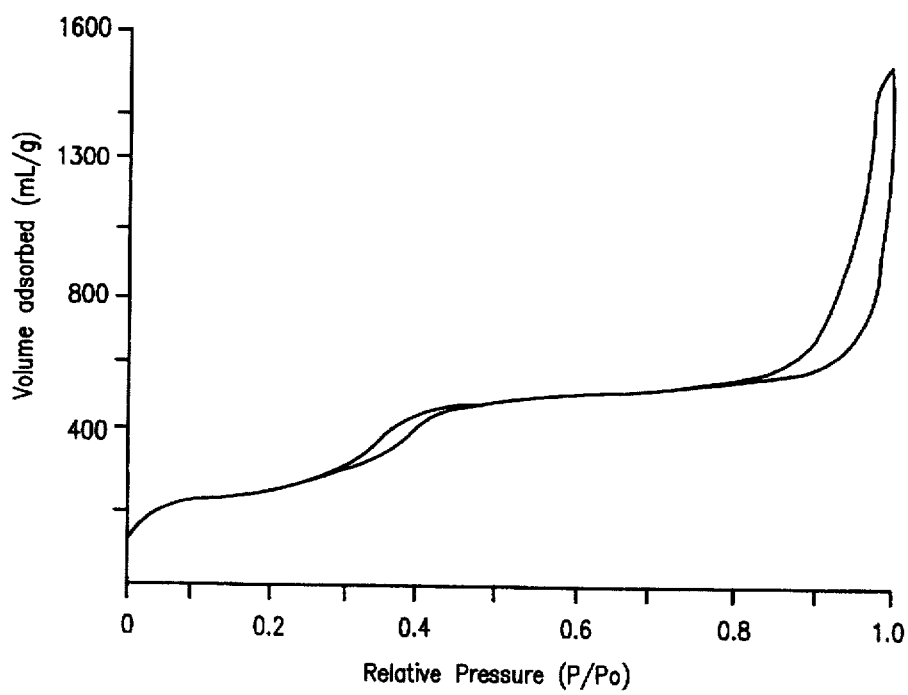

The present invention relates to a synthetic, semi-crystalline mesoporous inorganic oxide composition containing a fluoride having at least one resolved x-ray reflection corresponding to a lattice spacing of 3 to 10 nm, framework confined channels between 2 and 10 nm, and a specific surface area of 300 to 14000 square meters per gram and having a disordered worm-like assembly of channels.

The present invention also relates to a synthetic, semi-crystalline inorganic oxide composition prepared by reacting in a reaction mixture a non-ionic poly(alkylene oxide) derived surfactant as a template (N°) and a neutral inorganic oxide precursor (I°) in an aqueous hydrolyzing solution followed by addition of a fluoride ion to provide the composition as a particulate dispersion which is separated from the solution.

The present invention also relates to a method for the preparation of a synthetic semi-crystalline inorganic oxide composition which comprises: providing a mixture of (i) a neutral inorganic oxide precursor (I°) containing at least one element selected from the group consisting of di-, tri-, tetra-, penta- and hexavalent elements and mixture thereof; (ii) a non-ionic poly(alkylene oxide) surfactant (S°) as a template; and (iii) a hydrolyzing agent; adding a fluoride ion to the mixture in an amount which produces a particulate dispersion of the inorganic oxide precursor and the significant; separating at least some of the hydrolyzing agent and the surfactant to form the composition, wherein the composition has a disordered assembly of worm-like channels; and optionally calcining the composition.

The present invention also relates to a method for the preparation of a synthetic, semi-crystalline inorganic oxide composition which comprises: preparing a solution of a neutral inorganic oxide precursor (I°), containing at least one element selected from the group consisting of di-, tri-, tetra-, penta- and hexavalent elements and mixtures thereof with stirring and optionally aging the inorganic oxide precursor (I°) solution; preparing a homogeneous solution of a non-ionic poly(alkylene oxide) surfactant (S°) as a template in a hydrolyzing agent, and optionally in a co-solvent, by stirring it at a temperature between about minus 20° and plus 100° C.; mixing of the solutions of steps (a) and (b) at a temperature between about minus 20° and plus 100° C. which is aged to form the composition; adding a fluoride ion to the mixture in an amount which produces a particulate dispersion of the inorganic oxide and the surfactant; separating at least some of the hydrolyzing agent and surfactant from the composition; and optionally calcining the composition, wherein the composition has a disordered assembly of worm-like channels.

The present invention relates to a method for the preparation of a crystalline inorganic oxide composition which comprises: preparing a homogeneous solution of nonionic poly(ethylene oxide) surfactant as a template (N°) in a lower alkyl alcohol solvent by mixing at ambient temperature; mixing an inorganic metal precursor to the solution of step (a) at ambient temperature to form a homogeneous solution; aging the homogeneous solution for between about 10 to 12 hours; adding a fluoride to the mixture in an amount which produces a dispersion of the inorganic oxide and the surfactant; aging the dispersions with the fluoride salt; separating the aqueous solution, lower alkanol and at least some of the template from the dispersion; and drying the dispersion to form the composition, wherein the composition has a disordered assembly of worm-like channels.

The present invention relates to a method for the preparation of synthetic, semi-crystalline inorganic silicon dioxide composition which comprises: preparing a homogeneous aqueous solution of a nonionic poly(ethylene oxide) derived surfactant template (N°) with mixing at ambient temperature; adding an inorganic silica precursor to the solution of step (a) at ambient temperature with stirring to form a solid, precipitate; adding a fluoride ion to the mixture in an amount which produces a particulate dispersion of the silicon dioxide and the surfactant; separating the aqueous solution and template from the dispersion; drying the separated dispersion in air at ambient temperature; calcining the precipitate to remove the template between 673K and 973K in air to form the composition.

The present invention particularly provides a preferred totally nonionic template (N° I°) route to the preparation of quasi-crystalline oxide compositions comprising (a) preparing a homogeneous solution or emulsion of a nonionic polyethylene oxide-based surfactant (N°) by stirring, sonicating or shaking at standard temperature and pressure (STP); (b) addition of one or more neutral inorganic precursors with stirring at standard temperatures and pressures (STP) to the emulsion of step (a) at ambient temperature in the presence of fluoride ion (F⁻) to form a precipitated semi-crystalline dispersion; (c) separating the solvent and the hydrolyzing agent from the dispersed particles by filtration or centrifugation; (d) optionally calcining the quasi-crystalline product at 673K to 973K in air or (e) extracting the template through solvent extraction whereby the solvent is either water or ethanol.

PEO—based surfactants adopt spherical to long "worm-like" micellar structures in aqueous solution (Porter, M. R., Handbook of Surfactants 2nd ed., Blackie Academic & Professional, London (1994); Chu, B., Langmuir 11,414 (1995); and Lin, Z., et al., Langmuir, 8, 2200 (1992)). The pore structures of MSU-X aluminas prepared from these N° templates reflect the novel worm-like motif of the assembled surfactant. The worm-like channels, though more or less regular in diameter, have no discernable long range order. That is the arrangement of the packing channel system appears to be random, despite the presence of an XRD reflection.

The present invention thus provides a new route to inorganic oxide crystalline materials with a disordered assembly of worm-like channels that can be utilized as adsorbents, catalysts and catalyst supports for the catalytic conversion of organic substrates. The present invention is distinguished from the prior art by the new preparative N° I°, F⁻ method used to obtain the mesoporous crystalline inorganic oxide materials, the pore morphology of the said materials and the range of templated mesoporous metal oxide materials that can be prepared by this method. According to the method of the present invention, the formation of the mesoporous structure is accomplished by interaction (complexation and/or hydrogen bonding) between template molecules within micellar aggregates of nonionic polyethylene oxide-based templates and neutral inorganic oxide precursors, followed by hydrolysis and cross linking of $IO_x$ units, where I is a central metallic or non-metallic element coordinated to x oxygen atoms ($2 \leq x \leq 8$), in addition to F⁻ and OH⁻ ions. This interaction is most likely to occur between an I—OH unit and the terminal OH function of each surfactant molecule, or between the I—OH unit and the array of lone pair electrons on the template polar segment. The polar segment of the template in the present invention is flexible and appears to act in the fashion of a crown ether complexing a I—OH unit, thereby stabilizing a site of nucleation for subsequent condensation of the mesoporous quasi-crystalline inorganic oxide product, although the inventors do not want to be bound to any particular theory.

The fluoride prevents the gelation of the mixture of I° N° by a mechanism which is not completely understood. The fluoride becomes part of the mesoporous structure and is partially removed upon calcination. The fluoride is preferably provided as an inorganic alkali metal or alkaline earth metal salt in an amount between about 0.01 and 10% by weight of the solution.

The inventors know of no prior art teaching the preparation of micro-, meso-, or macro-porous inorganic oxide compositions by such a nonionic N° I° F⁻ mechanism involving crystallization of inorganic oxide precursors around well defined micelles of nonionic surfactants using fluoride ion. Specifically, the present result is achieved by using micelles of a nonionic surfactant to template and assemble a neutral inorganic reactant precursor into a mesoporous framework structure. Complexation and/or hydrogen bonding between the template and the reagent is believed to be the primary driving force of the assembly of the framework in the current invention. The aforementioned method consists of the formation of a solid precipitate by the mixing of a solution or emulsion of a polyethylene oxide-based nonionic surfactant, with a neutral inorganic oxide precursor. The latter being an inorganic alkoxide, in the presence of a hydrolyzing agent, followed by aging and crystallization under stirring, sonication or shaking at ambient temperature and addition of fluoride ion. The template may be recovered by extraction with ambient temperature alcohol or hot water whose temperature exceeds the cloud point of the template. Complete removal of the remainder of the template and final crosslinking of the $IO_x F^-$ framework is accomplished by calcination in air at temperatures between 673K and 973K for at least 4 h.

The molar ratio of inorganic oxide precursor to surfactant is between 10:1 and 20:1 depending upon the specific template being used. The concentration of surfactant in solution is between 0.003 mol $L^{-1}$ and 0.4 mol $L^{-1}$ again depending upon the surfactant being used and the pore size desired.

The crystalline inorganic oxide composition of the present invention in its calcined state has the formula:

$$nR\text{—}EO/A_vG_wC_xD_yO_z$$

wherein R—EO is at least one of a selection of nonionic alkyl, or alkyl/aryl polyethylene oxide or polyethylene oxide-polypropylene oxide-polyethylene oxide block co-polymer molecules and wherein when R—EO is present n is between about 0.01 and 1; A is at least one optional trivalent element such as Al, Ga or Fe; B is at least one optional tetravalent metallic element such as Ge, Ti, V, Sb or Zr; C is the optional tetravalent element Si; D is an optional pentavalent or hexavalent element such as V, W or Mo; O is oxygen and v, w, x, y and z are the molar stoichiometries of A, B, C, D and O respectively. In the calcined composition, n=0, $0.001 \leq v \leq 2$, $0.001 \leq w \leq 1$, $0.001 \leq x \leq 1$, $0.001 \leq y \leq 2$ and $2 \leq z \leq 6$.

Preferably the structures have the formula:

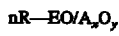

$$nR\text{—}EO/A_xO_y$$

wherein $A_xO_y$ is written in anhydrous form wherein R—EO is selected from the group consisting of nonionic alkyl polyethylene oxide, alkyl and aryl polyethylene oxide, and polyethylene oxide-polypropylene oxide-polyethylene oxide block co-polymer molecules and wherein when R—EO is present n is between about 0.01 and 1; A is a metal atom; O is oxygen and x and y are the molar stoichiometries of A and O, such that in the composition when calcined, n is about 0, x is about 1 and y is between about 1 and 3.

The semi-crystalline mesoporous materials of the present invention may be described as being formed by hydrogen-bonding between the terminal hydroxyl function or the array of lone pair electrons on the O atoms of the ethylene oxide units of the template molecules and any M—(OR)$_x$ compound. This H-bonding is followed by hydrolysis and subsequent condensation and cross-linking of IO$_x$ units under ambient or elevated temperature reaction conditions. Specifically, the said method comprises the formation of an organic/inorganic solution by the mixing of an aqueous or alcoholic solution of nonionic surfactant with the desired amount of Si-alkoxide, M-Si double alkoxide, mixtures of Si- and M-alkoxides or pure M-alkoxides (where M=Al, Ca, Cr, Fe, Ga, Ge, Mg, Mo, Nb, Sb, Sn, Ti, V, W, or Zr), followed by aging and subsequent precipitation under stirring for at least 16 h.

The composition of this invention is characterized by at least one strong XRD peak at a basal ($d_{100}$) spacing of at least 3.0 nm or larger. The compositions are also distinguished in part from those of the prior art, specifically MCM-41 materials, by lower crystallographic regularity and larger framework wall thicknesses ($\geq 2.0$ nm).

In the present invention, the template may be removed from the condensed reaction products in at least three different ways: (i) air drying followed by calcination in air or in inert gas preferably at a temperature from 673K to 973K for 4 to 6 h; (ii) solvent extraction of the template from the air dried material using alcohol or hot water; (iii) combination of (i) and (ii).

Procedure (i) results in the complete oxidation and thereby decomposition of the occluded template. The current invention improves on the environmental impact of the prior material preparation art, as the oxidation products of quaternary ammonium and amine based surfactant templates described in the prior art, include environmentally undesirable $NO_x$ gases, while the oxidation products of polyethylene oxide based surfactants are the more environmentally compatible $H_2O$ and $CO_2$ gasses. Procedure (ii) allows the template to be recovered and subsequently recycled and reused. If the template is removed by procedure (ii), the product should be calcined in air or inert gas to remove the final traces of the template and to complete the cross linking of the mesostructure.

After calcination, the present compositions may be used as adsorbents, molecular sieves, catalysts and catalyst supports. When the calcined product is appropriately substituted or subsequently impregnated as taught in Ger. Pat. (DD) No. 286,522, with the correct amount of a catalytically active element, such as Rh, Nb, Re, Ag, Au, Cu, Co, Cr, Ni, Fe, Ir, Mo, Pt, Pd, Sn, Ti, V, W, Zn and Zr or mixtures thereof, or when intercalated with transition metal inorganic metallocycles, it can be used as a catalyst for cracking, hydrocracking, hydrogenation-dehydrogenation, isomerization or oxidations involving large and small organic substrates.

The new synthesis method of the compositions of this invention involves the preparation of solutions or emulsions of a surfactant template compound and reaction of this solution with liquid di-, tri-, tetra-, penta- or hexa-valent metal or metalloid hydrolyzable reagents in the presence of a hydrolysing agent under stirring, sonication or shaking, until formation of the desired precipitated product is achieved and recovering the solid material. The template is described more particularly as a nonionic (neutral) polyethylene oxide based molecule that would possess one of many different molecular structures and the hydrolysing agent is described as water.

There are four basic types of surfactant molecules that are described herein. The alkyl-polyethylene oxides; such as are related to the TERGITOL 15-S-m products are derived from the reaction of ethylene oxide with a primary or secondary alcohol and possess the basic formula $R_n\text{—}O(EO)_m H$ where R is a hydrophobic alkyl group with n ranging from 1 to at least 20 carbon atoms, EO is a hydrophilic ethylene oxide unit ($OCH_2CH_2$) with m ranging from about 7 to 40, preferably at least 20.

The alkyl-phenyl polyethylene oxides; such as IGEPAL-RC and TRITON-X, possess the same range of structures as the alkyl-polyethylene oxides, with the exception that the primary IGELPAL, secondary or tertiary TRITON-X R group is bound to the EO units through a hydrophobic phenoxy group (PhO). These molecules then, have the basic formula; $R_n\text{—}Ph\text{—}O(EO)_m H$, preferably where m is 8 to 10 and n is 8.

The polyethylene oxide (PEO)-polypropylene oxide (PPO) molecules; such as PLURONIC, are derived from the addition of hydrophobic propylene oxide to propylene glycol followed by the addition of hydrophilic ethylene oxide. They are defined as $PEO_n$—$PPO_m$—$PEO_n$ tri-block co-polymers wherein n is controlled by length to constitute from 10% to 80% by weight of the final product. The order of the PEO and PPO units may be reversed in order to produce the $PPO_m$—$PEO_n$—$PPO_m$ triblock co-polymers; PLURONIC-R. Preferably n is 30 and m is 13.

A fourth basic PEO based surfactant type is derived by from the substitution of the hydrogens of ethylene diamine by ethylene oxide and propylene oxide units to form the X shaped, TETRONIC, molecules with basic formula; $((EO)_n$—$(PO)_m)_2$—$NCH_2CH_2N$—$((PO)_m$—$(EO)_n)_2$. The order of the PEO and PPO groups in these molecules may also be reversed to form TETRONIC. Preferably m is 13 and n is 30.

The preferred preparation procedures of the said compositions comprise steps as follows:

(i) preparing a solution of the desired template under stirring, in a solvent that is either, water for the preparation of silicon dioxide, or alcohol for the preparation of metal oxide compositions from more reactive alkoxide precursors;

(ii) addition of the desired metal oxide precursor to the surfactant solution under stirring, sonication or shaking;

(iii) preparation of a solution of the hydrolysing agent in the alcohol used in step (i). The hydrolysing agent is water;

(iv) very slow addition of the hydrolysing agent to the template/inorganic precursor solution under stirring. (iii and iv are not required if templated silica is being prepared);

(v) aging of the total solution;

(vi) addition of fluoride ion to the solution;

(vii) separation of the product from the supernatant liquid by filtration or centrifugation;

(viii) air drying of the product followed by heat treatment at 373K;

(ix) separation of the template by extraction with either ethanol or hot water or a mixture thereof; and (x) calcination of the templated product in air or inert gas at between 673K and 973K for 0.5 h for extracted compositions or for 4 to 6 h for unextracted products.

The inorganic oxide precursors are single or double metal alkoxide compounds, The list of preferred alkoxides includes but not exclusively: aluminum(III) ethoxide, aluminum(III) isopropoxide, aluminum(III) n-, sec- or tert-butoxide, antimony(III) isopropoxide, antimony(III) n-butoxide, calcium(II) ethoxide, calcium(II) isopropoxide, calcium(II) tert- butoxide, chromium(IV) isopropoxide, chromium(IV) tert- butoxide, copper(II) methoxyethoxide, gallium(III) isopropoxide, germanium(IV) ethoxide, germanium(IV) isopropoxide, indium(III) isopropoxide, iron(III) ethoxide, iron(III) isopropoxide, iron(III) tert-butoxide, lead(II) isopropoxide, lead(II) tert- butoxide, magnesium(II) ethoxide, manganese (II) isopropoxide, molybdenum(V) isopropoxide, niobium(V) ethoxide, silicon(IV) methoxide, silicon(IV) ethoxide, silicon(IV) propoxide, silicon(IV) butoxide, silicon(IV) hexoxide, strontium(II) ethoxide, tin(IV) isopropoxide, titanium(IV) ethoxide, titanium(IV) propoxide, titanium(IV) isopropoxide, titanium(IV) butoxide, titanium(IV) octadecoxide, tungsten(VI) ethoxide, tungsten (VI) isopropoxide, vanadium(V) triisopropoxide oxide, zinc(II) isopropoxide, zinc(II) tert- butoxide, zirconium(IV) n-propoxide, zirconium(IV) isopropoxide, zirconium(IV) butoxide, zirconium(IV) tert- butoxide, aluminum(III) silicon(IV) alkoxide, titanium(IV)silicon(IV) polyethoxide and other mixtures of the aforementioned alkoxide compounds. The alcohols used in step (i) of the preparation art correspond to the alcoholate ligand from which the metal alkoxide is derived. The alcohols thus preferred are methanol, ethanol, n- and isopropanol and n-, sec-, tert-, butanol. The alcohols contain 1 to 4 carbon atoms.

Said mixed metal alkoxides are obtained through proprietary preparations or by reaction of desired metal alkoxides in desired molar ratios under reflux (433K) for 3–4 h.

The said reacting of the inorganic precursor and the template solution is achieved at room temperature (298K to 303K) under stirring for at least 16 h.

Aging of the reaction mixture may be achieved at room temperature either under stirring, sonication or shaking or by being left to stand for at least 120 minutes. More specifically, the reacting occurs through complexation or H-bonding between a neutral nonionic template and neutral inorganic oxide precursors, followed by hydrolysis and crosslinking of $IO_X$ units at ambient or elevated reaction temperatures. The complexation, or H-bonding most likely occurs between the terminal OH group of the template molecules and the hydrolyzable ligand on the inorganic precursor molecule, or between the inorganic precursor molecule and the electron lone pairs of the ethylene oxide groups in the hydrophilic head group of the template molecules.

The fluoride ion is added and the solution is shaken and separated by centrifugation. The product can be air dried or calcined.

The calcination is performed in a temperature controlled oven by heating in air at a rate of 2K min$^{-1}$ to a final temperature between 673K and 973K for at least 30 min, preferably 4 to 6 h.

The outstanding features of the present invention are:

(i) The use of nonionic (N°) polyethylene oxide based templates, to assemble mesoporous metal oxide framework compositions with a worm-like array of channels of regular diameter in the mesopore size range;

(ii) The use of neutral metal alkoxide inorganic oxide precursors (I°);

(iii) The reaction of solutions of inorganic oxide precursors under reflux for 3–4 h in order to obtain polymerized I—O—I' species;

(iv) The use of hydrogen bonding or non-electrostatic complexation as the driving force for the neutral N° I° F$^-$ assembly of the nonionic template and the neutral inorganic oxide precursor species;

(v) The use of ambient reaction conditions to prepare the templated product;

(vi) The recovery and recycling of the template through simple solvent extraction from the product.

(vii) The use of low cost, non-toxic, biodegradable and low energy requirement preparation art.

The templated inorganic oxide compositions of the present invention can be combined with other components, for example, zeolites, clays, inorganic oxides or organic polymers or mixtures thereof. In this way adsorbents, ion-exchangers, catalysts, catalyst supports or composite materials with a wide variety of properties may be prepared. Additionally, one skilled in the art may impregnate or encapsulate transition metal macrocyclic molecules such as porphyrins or phthalocyanines containing a wide variety of catalytically active metal centers.

Additionally, the surfaces of the compositions can be functionalized in order to produce catalytic, hydrophilic or hydrophobic surfaces. This functionalization can be introduced during the synthesis procedure by replacing the metal alkoxide precursor with alkyl metal alkoxide [MR(OR)$_{x-1}$] reactants, or metal carboxylate reactants. The surfaces may be functionalized after synthesis by reaction with various chlorides, fluorides, sylisation or alkylating reagents.

The following are specific examples of the present invention intended to illustrate but not to limit the invention.

EXAMPLE 1

(This example shows that this new process leads, from same reagents, to materials with different structures).

A 0.02M solution of an alkyl polyethylene oxide $C_{11-15}H_{23-31}$—$(CH_2CH_2O)_{15}H$ (TERGITOL 15-S-15, Union Carbide, Danbury, Conn.) was prepared by dissolution of 0.877 g of TERGITOL in 50 mL of water. After complete dissolution, 1.664 g of tetraethyl orthosilicate (TEOS) was then added at room temperature in order to obtain a molar ratio TEOS/TERGITOL 15-S-15=8, while the solution was sonicated. The so obtained solution was cloudy. The sonication was stopped and the solution was allowed to stand for around 12 hours, until it had formed a clear colorless solution.

Figure 3A:
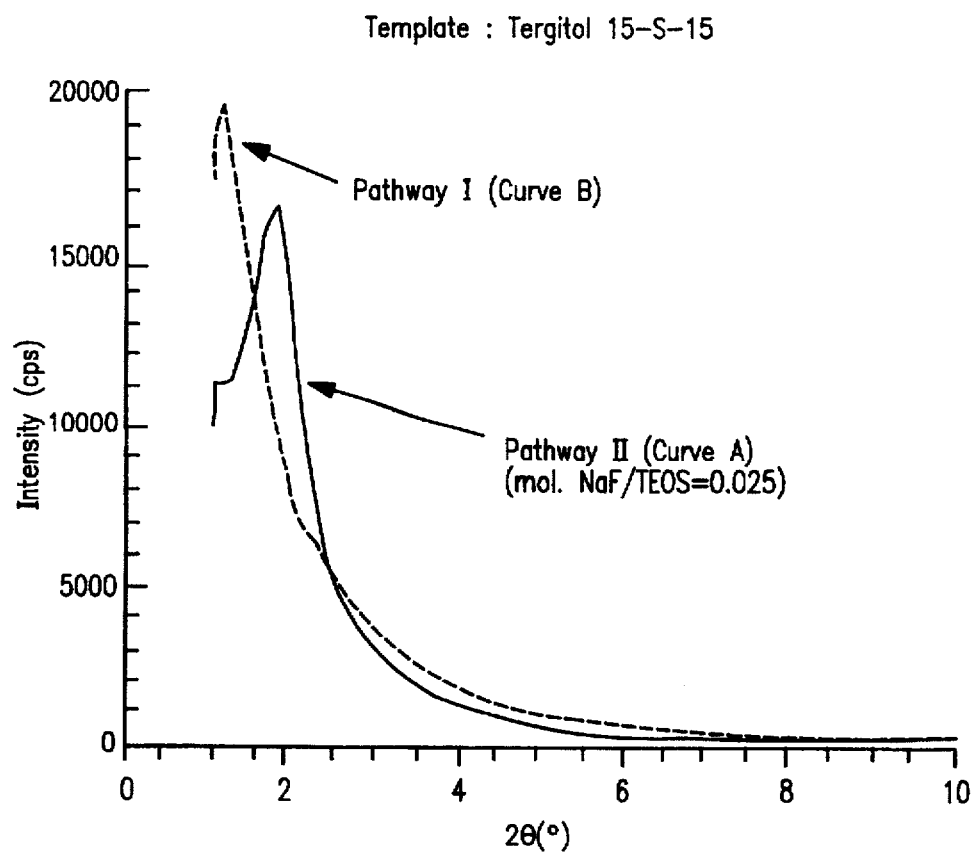
FIG. 3A is a graph showing the X-ray powder diffraction patterns of the as synthesized (curve A) and calcined products with and without fluoride ion (curve B) from Example 1.
Figure 3B:
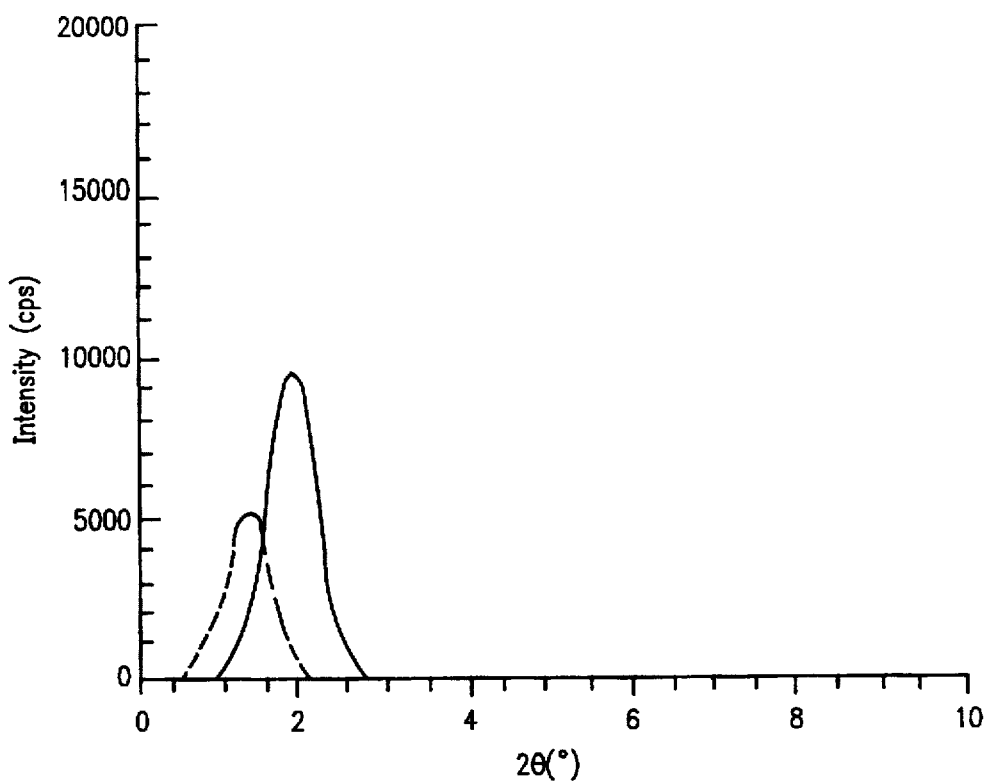
FIG. 3B is a graph showing the peaks after substracting background.
Figure 3C:
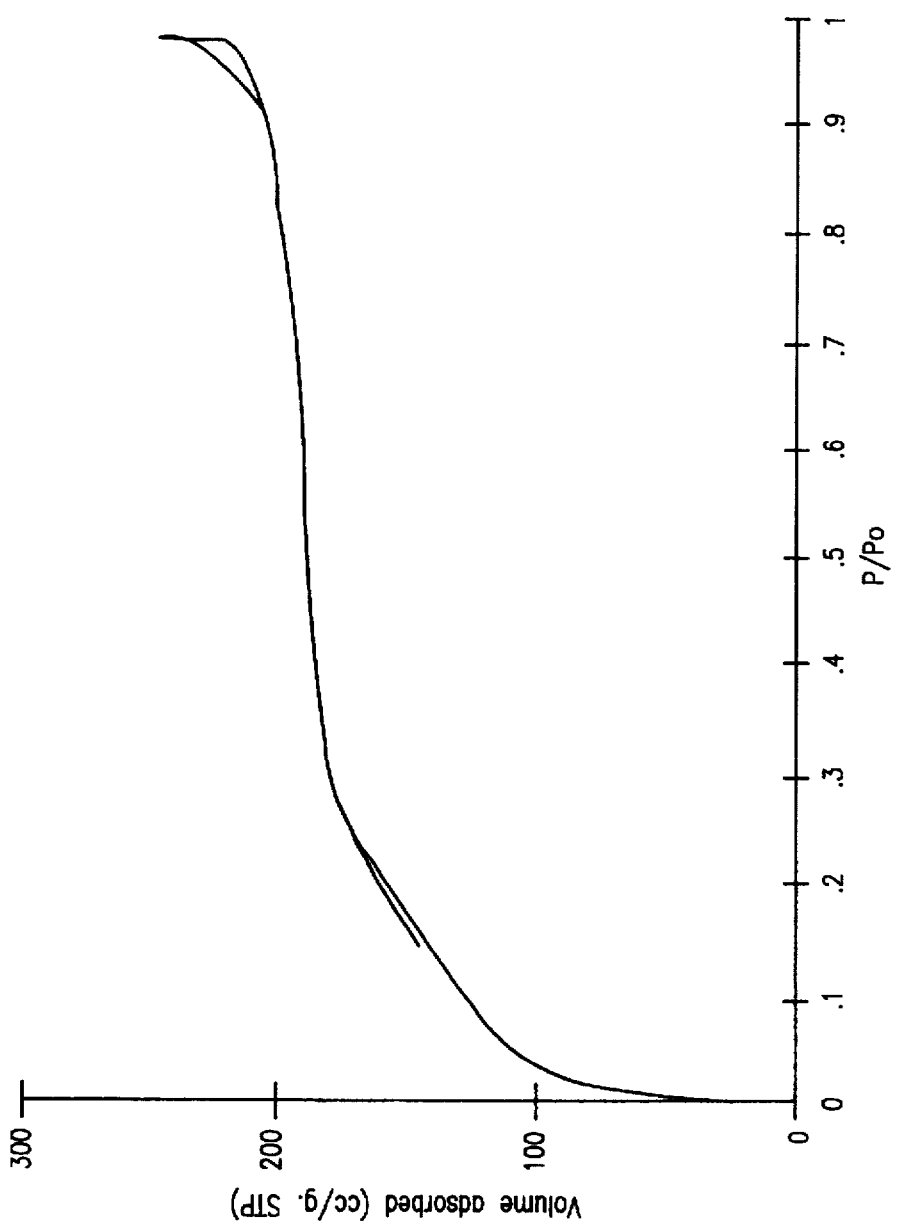
FIGS. 3C and 3E are nitrogen absorption curves.
Figure 3D:
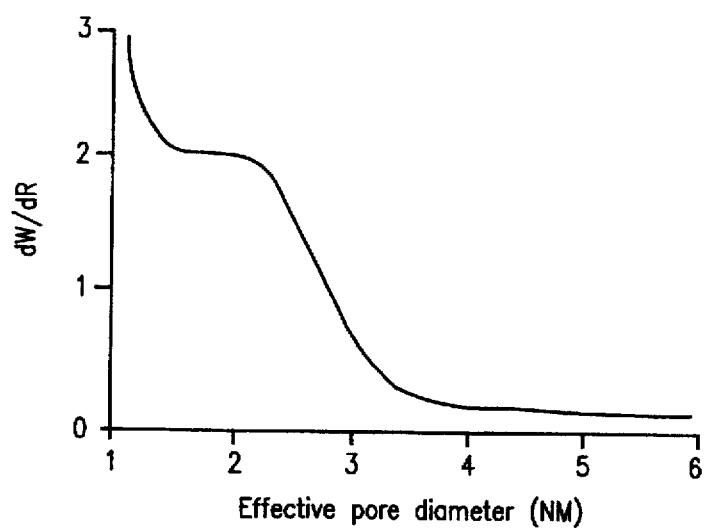
FIGS. 3D and 3F are graphs of the corresponding Horvath-Kawazoe framework-confined mesopore size distribution curve.
Figure 3E:
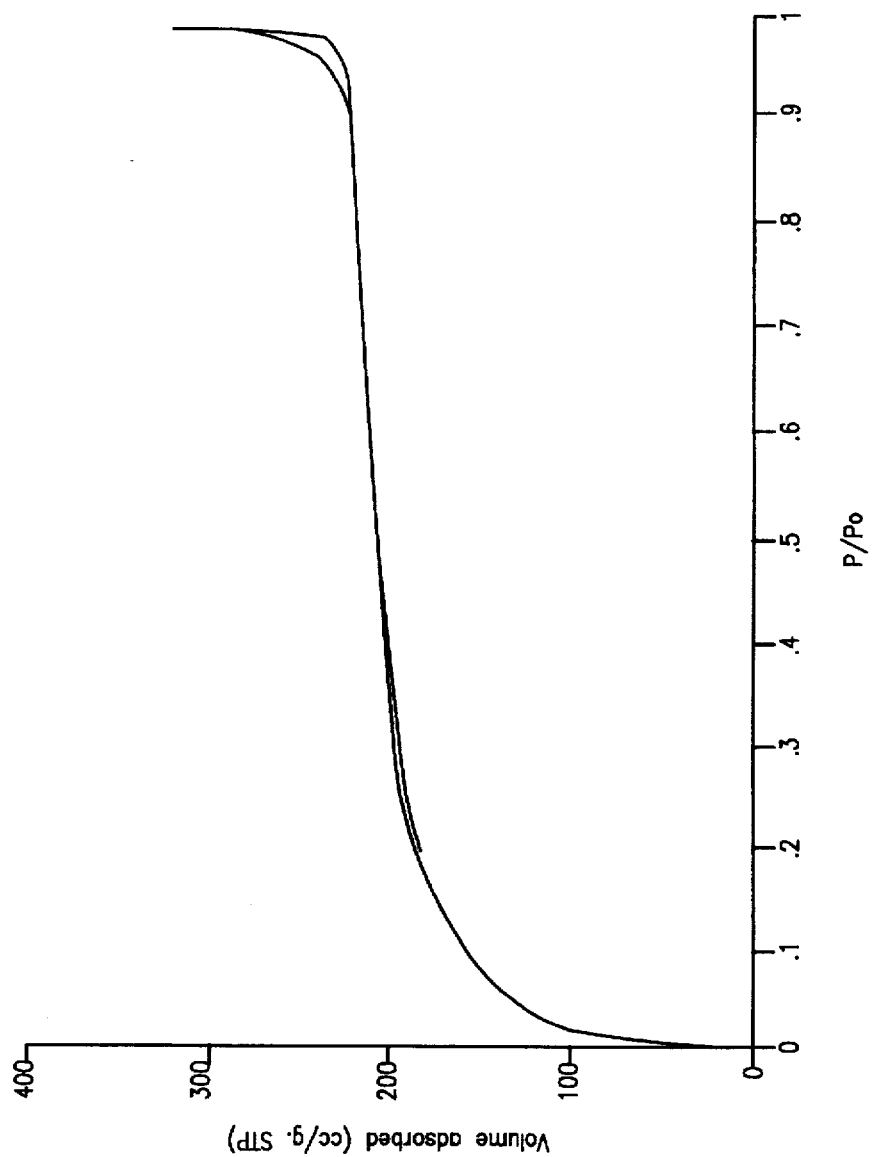
Figure 3F:
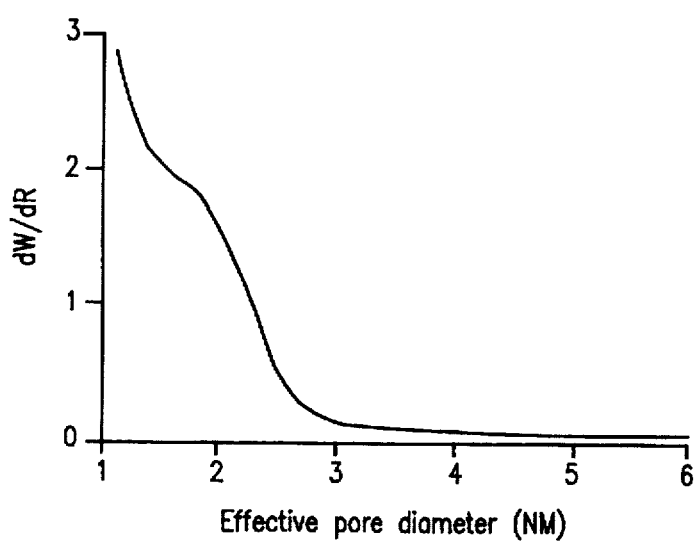

A 0.238M solution of sodium fluoride NaF, prepared by dissolving 2.5 g of NaF in 250 mL of water. 0.84 mL of this solution was added in the solution in order to obtain molar ratio NaF/TEOS=2.5%. The solution so obtained was placed in a shaking bath (shaking speed:40 rpm) thermostated at 35° C., for 48 hours. A white suspension appears with progressive reaction time. After 48 hours, the powder was separated from solution by centrifugation (5,000 rpm, 10 min.), dried at 70° C., then calcined in air at 5° min.$^{-1}$ to 200° C. for 6 hours, then 600° C. for 6 hours. X-ray patterns obtained from compounds prepared with Tergitol 15-S-15 at 25° C. by pathway I as described in Ser. No. 08/465,770, filed Jun. 6, 1995 (Bagshaw and Pinnavaia) (dotted line) and pathway II with fluoride (solid line) are compared in FIG. 3A. The diffraction peaks obtained after substracting the background from the experimental pattern are also displayed in FIG. 3B. First, one can see that the diffraction peak does not appear at the same angle for both processes. It corresponds to a d-spacing of 7.0 nm for the compound obtained through prior art pathway I and 4.9 nm for the compound obtained through pathway II. Second, it can be seen that material prepared by pathway II exhibits a more intense peak and a lower background, which can be related to the amount of amorphous phase. Thus, pathway II leads to a more ordered silica framework than pathway I. Difference in the structure of materials is confirmed by the nitrogen adsorption that gives information on pore size. FIGS. 3B and 3C display nitrogen adsorption of materials prepared with TERGITOL 15-S-12 ($C_{11-15}H_{23-31}$—$O(CH_2CH_2O)_{12}H$) through pathway II, without and with fluoride (NaF/TEOS= 2.5 mol. %) respectively. Their channel size is smaller than reported for pathway I (3.1 nm) and it changes with the fluoride content: 2.0 nm and 2.3 nm for compound prepared without or with fluoride, respectively.

EXAMPLES 2 and 3

These examples show that the process of the present invention allows us to use some surfactants that are not efficient with the process of Ser. No. 08/465,770. For comparison, two samples were prepared by following pathway I, using polyoxyethylene (20) sorbitan monostearate (TWEEN 60) and polyoxyethylene (20) sorbitan monooleate (TWEEN 80). A 0.1M solution of surfactant was prepared by dissolving 6.46 g of TWEEN 60 or 6.45 g of TWEEN 80 in 50 mL of water. 8.32 g of tetraethyl orthosilicate (TEOS) was added in order to get the molar ratio TEOS/surfactant=8. The solution was kept at room temperature under stirring for two days. After two days, the solution prepared with TWEEN 60 exhibited only a slight hydrolysis and the solution prepared with TWEEN 80 exhibits no reaction.

Figure 4:
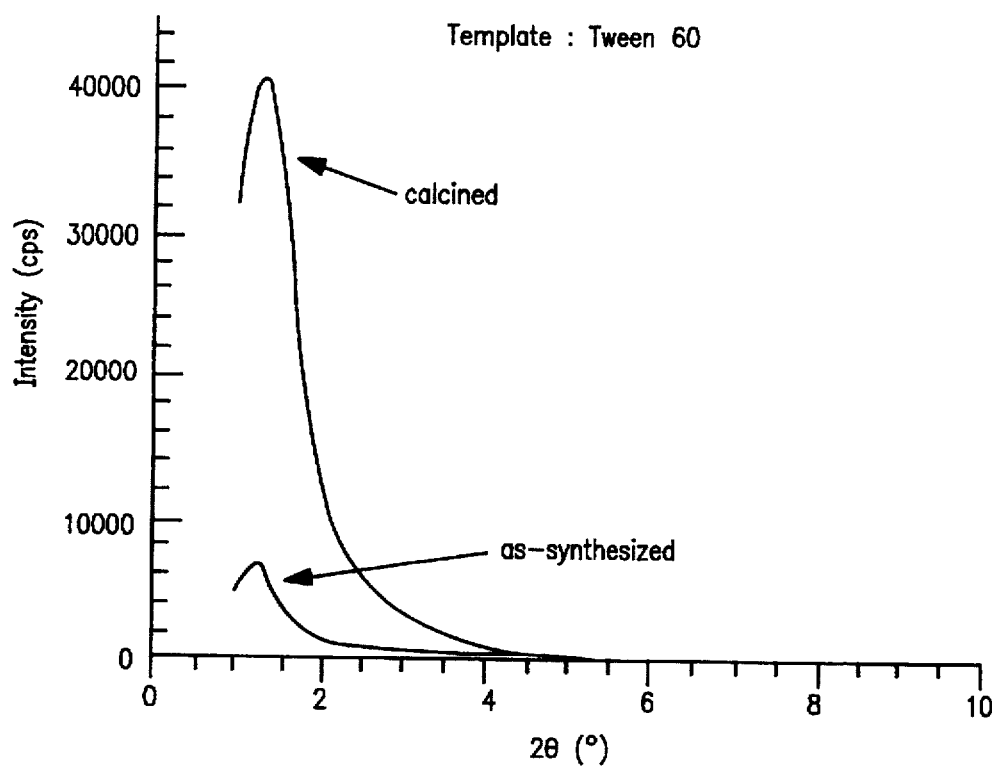
FIGS. 4 and 5 are graphs of the X-ray powder diffraction patterns of the calcined products from Examples 2 and 3.
Figure 5:
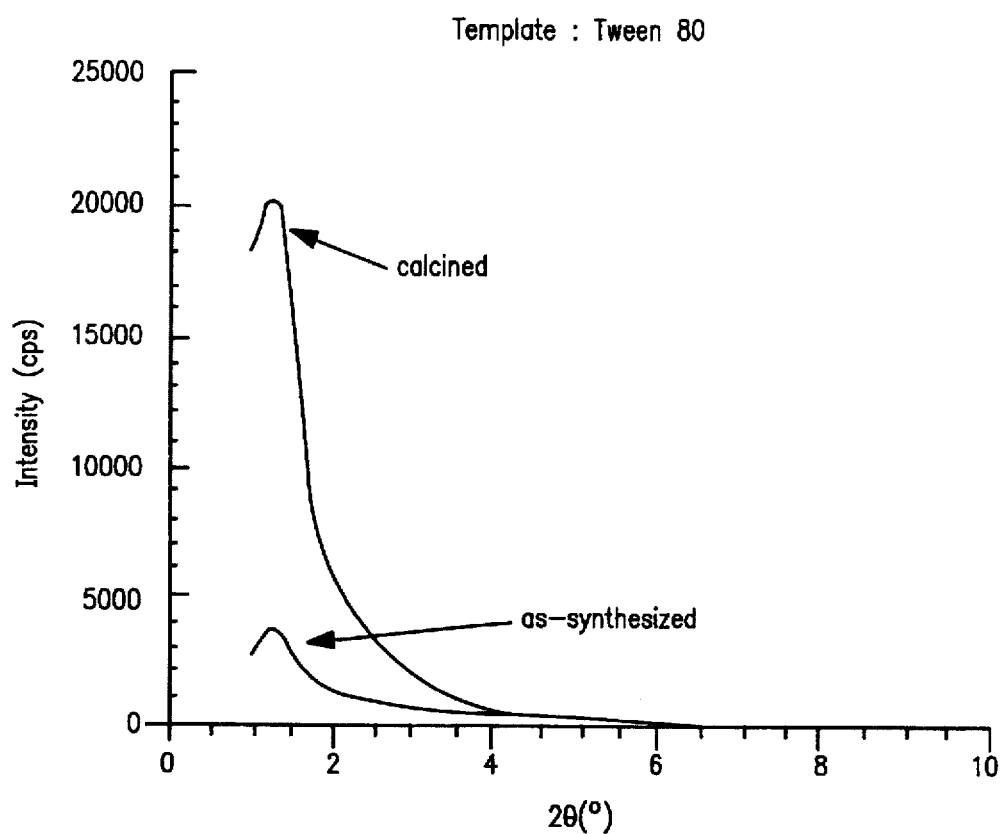
Figure 6:
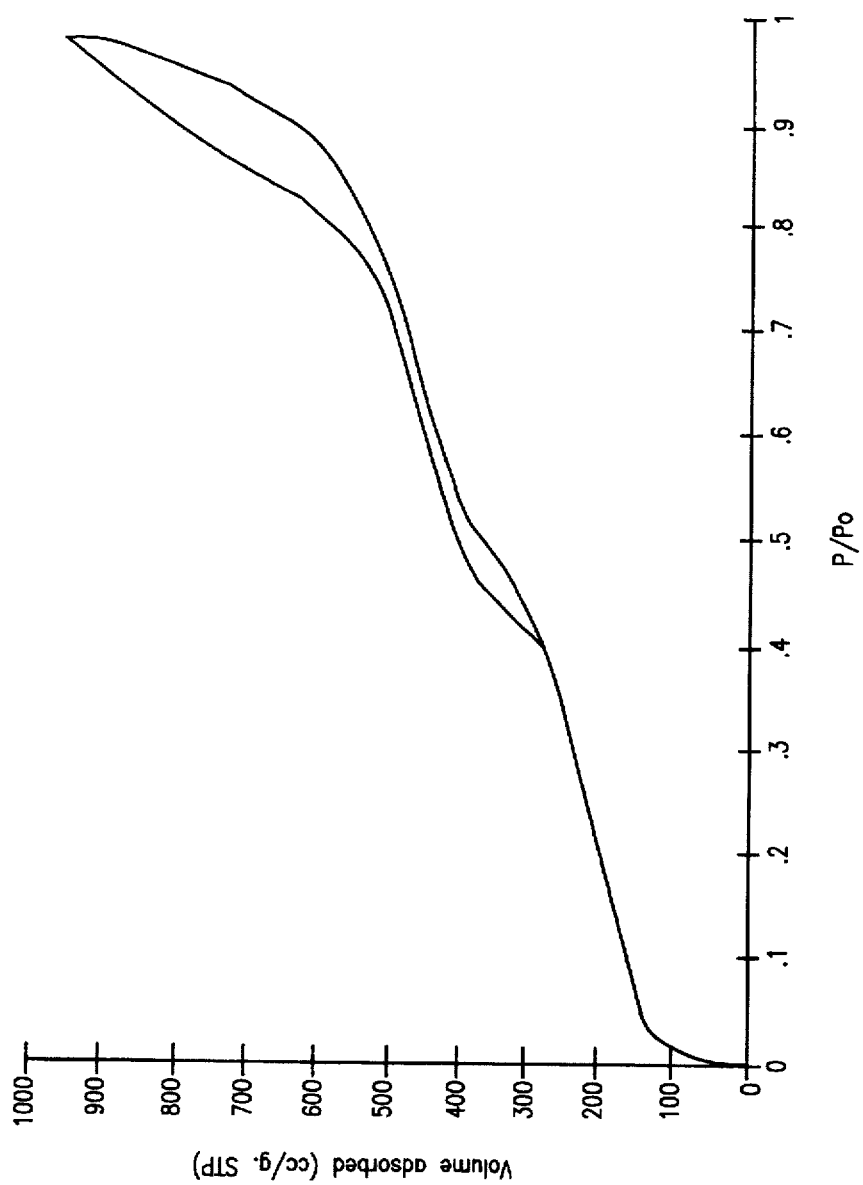
FIGS. 6 and 7 are graphs of the $N_2$ adsorption-desorption isotherm for the calcined MSU-3 product from Examples 2 and 3.
Figure 6A:
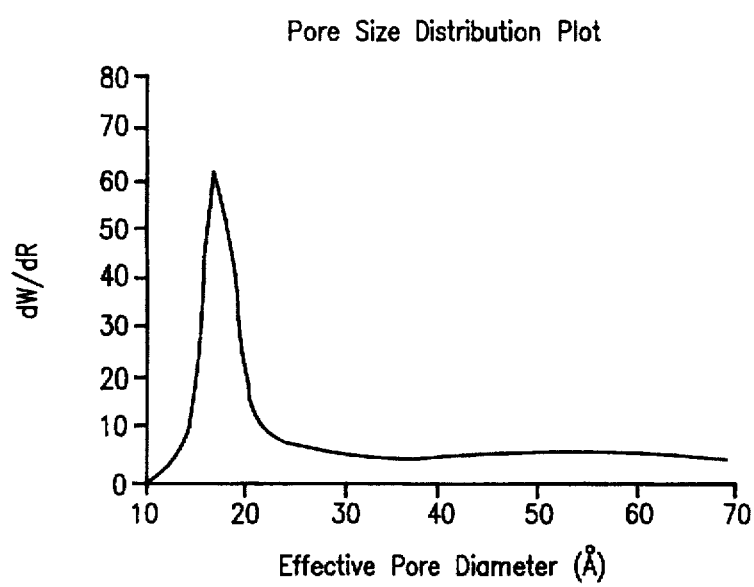
FIGS. 6A and 7A are graphs of the corresponding Horvath-Kawazoe framework-confined mesopore size distribution curve.
Figure 7:
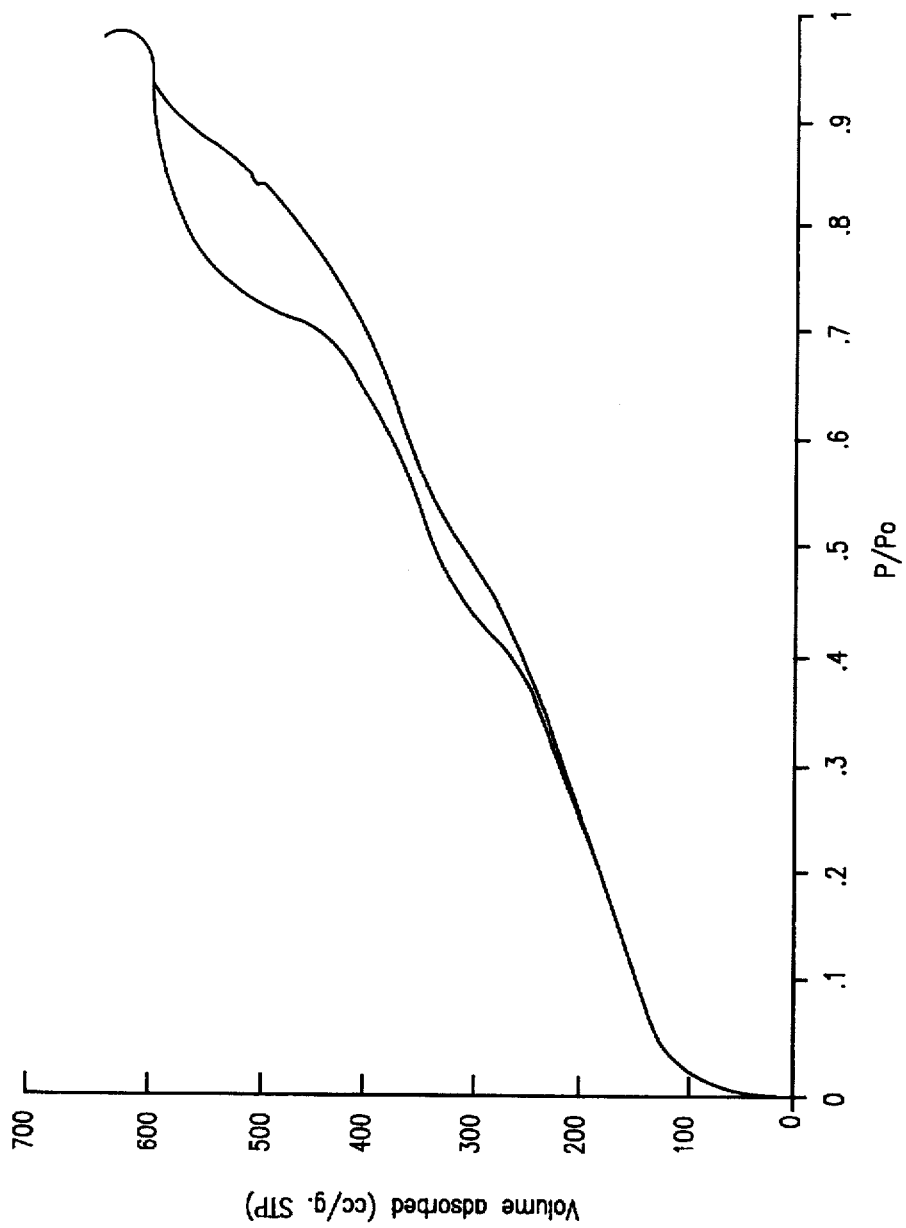
Figure 7A:
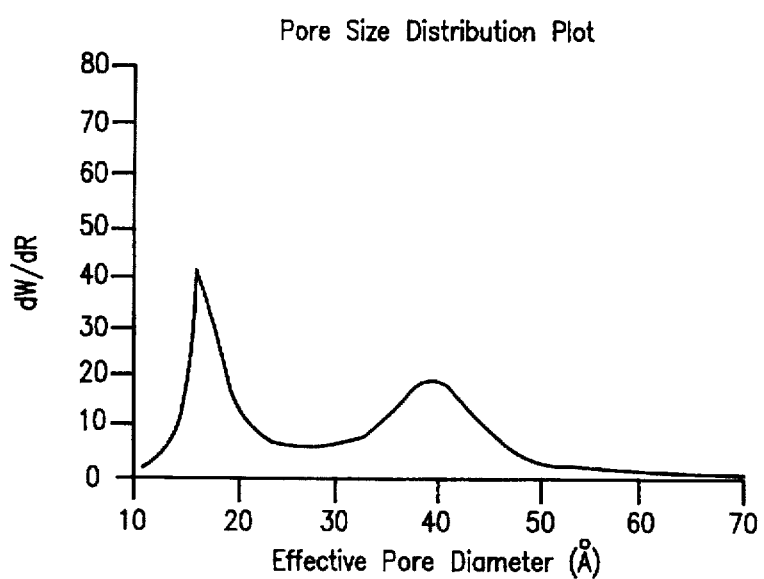

Examples 2 and 3 were prepared by using polyoxyethylene (20) sorbitan monostearate (TWEEN 60™) and polyoxyethylene (20) sorbitan monooleate (TWEEN 80™), respectively. A 0.02M solution of surfactant was prepared by dissolving 1.292 g of TWEEN 60 or 1.290 g of TWEEN 80 in 50 mL of water. 1.66 g of tetraethyl orthosilicate (TEOS) was added under sonication in order to get the molar ratio TEOS/surfactant=8. The solution reacted for 10 hours until it was clear and 0.84 mL of a 0.238M solution of sodium fluoride NaF was then added. The solution was kept at 35° C. under slow shaking for two days. Both solutions lead to a colloidal solution that finally precipitated as the particles size increases with time. After 48 hours, the powder was separated from solution by centrifugation (5,000 rpm, 10 min.), dried at 70° C., then calcined in air at 5° min.$^{-1}$ to 200° C. for 6 hours, then 600° C. for 6 hours. Materials prepared with TWEEN 60 (Example 2) and TWEEN 80 (Example 3) exhibit a d-spacing of 6.6 nm (FIG. 4) and 7.1 nm (FIG. 5) respectively. The pore diameter deduced from nitrogen adsorption for TWEEN 60 is=3.5 nm (FIG. 6A). Material obtained with TWEEN 80 exhibits a double pore distribution with mesopores of ~3.5 nm and 80 nm (FIG. 7A). This double channel distribution has never been observed with any templated mesostructures. FIGS. 6 and 7 show the nitrogen absorption.

EXAMPLES 4 TO 9

These examples show that the fluorine concentration controls the structure of the final product. Five 0.02M solutions of an alkyl polyethylene oxide $C_{11-15}H_{23-31}$—$O(CH_2CH_2O)_{12}H$ (TERGITOL 15-S-12, Union Carbide, Danbury, Conn.) were prepared by dissolution of 0.738 g of TERGITOL in 50 mL of water. After whole dissolution, 1.664 g of tetraethyl orthosilicate (TEOS) was then added, under sonication, at room temperature in every solution in order to get the molar ratio TEOS/TERGITOL 15-S-15=8. Solutions were then rested for almost 12 hours or until they had recovered a clear colorless aspect.

A 0.238M solution of sodium fluoride NaF previously prepared by dissolving 2.5 g of NaF in 250 mL of water as used at 0.0, 0.33, 0.84, 1.68, 2.52 or 3.36 mL in the five solutions respectively, in order to obtain molar ratios NaF/TEOS=0 (Example 4), 1.0 (Example 5), 2.5 (Example 6), 5.0 (Example 7), 7.5 (Example 8) and 10% (Example 9). Solutions so obtained were placed in a shaking bath (shaking speed: 40 rpm) thermostated at 35° C., for 48 hours. A white suspension appeared progressively. After 48 hours, the powder was separated from solution by centrifugation (5,000 rpm, 10 min.), dried at 70° C., then calcined in air t 50° C. min$^{-1}$ to 200° C. for 6 hours, then 600° C. for 6 hours. The results are shown in Table 1.

TABLE 1

| Example | NaF/TEOS (mol. %) | d-spacing (nm) | Pore size (nm) | Surface area (m²g⁻¹) |
|---|---|---|---|---|
| 4 | 0 | 4.2 | 2.0 | 676 |
| 5 | 1.0 | 4.7 | 2.5 | 688 |
| 6 | 2.5 | 4.8 | 2.7 | 652 |
| 7 | 5.0 | 4.9 | | |
| 8 | 7.5 | 5.4 | | |
| 9 | 10 | 5.4 | 3.2 | 509 |

EXAMPLES 10 TO 14

These examples show that the synthesis temperature can modify the final structure of the product.

Five 0.02M solutions of an alkyl polyethylene oxide $C_{11-15}H_{23-31}$—$O(CH_2CH_2O)_{12}H$ (TERGITOL 15-S-12, Union Carbide, Danbury, Conn.) were prepared by dissolution of 0.738 g of TERGITOL in 50 mL of water. After whole dissolution, 1.664 g of tetraethyl orthosilicate (TEOS) was then added, under sonication, at room temperature in every solution in order to get the molar ratio TEOS/TERGITOL 15-S-15=8. Solutions were rested for almost 12 hours or until they had recovered a clear colorless aspect.

A 0.238M solution of sodium fluoride NaF was previously prepared by dissolving 2.5 g of NaF in 250 mL of water. 0.84 mL of this solution was added in the TEOS solution, in order to obtain a molar ratio NaF/TEOS=2.56. Each solution was placed in a shaking bath (shaking speed: 40 rpm) thermostated at either 25° C. (Example 10), 35° C. (Example 11), 45° C. (Example 12), 55° C. (Example 13) or 65° C. (Example 14), for 48 hours). A white suspension appeared progressively. After 48 hours, the powder was separated from solution by centrifugation (5,000 rpm, 10 minutes), dried at 70° C., then calcined in air at 5° C. min⁻¹ to 200° C. for 6 hours, then 600° C. for 6 hours.

| Example | reaction temperature (°C.) | d-spacing (nm) | Pore size (nm) | Surface area (m²g⁻¹) |
|---|---|---|---|---|
| 10 | 25 | 4.5 | 2.1 | 576 |
| 11 | 35 | 4.8 | 2.7 | 652 |
| 12 | 45 | 5.1 | 3.2 | 601 |
| 13 | 55 | 5.2 | 3.5 | 626 |
| 14 | 65 | 5.2 | 4.5 | 580 |

Figure 8:
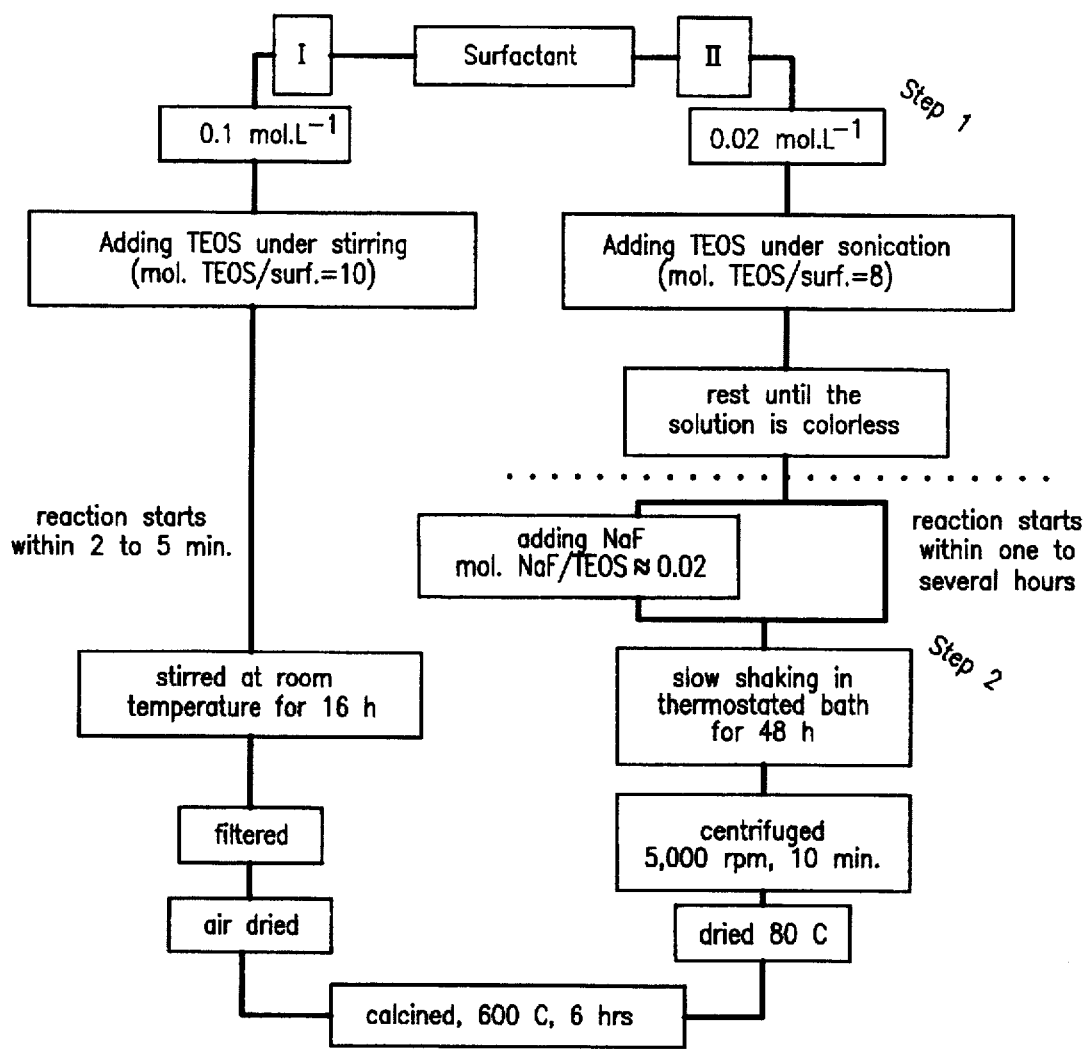
FIG. 8 is a flow chart showing the pathway II of the present invention contrasted with pathway I.

FIG. 8 is a flow chart schematically showing the process of pathway II contrasted with that of pathway I. As can be seen there are significant differences resulting from the use of the fluoride ion.

It is intended that the foregoing description be only illustrative of the present invention and that the present invention be limited only by the hereinafter appended claims.

We claim:

1. A synthetic, semi-crystalline mesoporous inorganic metal oxide composition containing fluoride ion having at least one resolved x-ray reflection corresponding to a lattice spacing of 3 to 10 nm, framework confined channels between 2 and 10 nm, and a specific surface area of 300 to 1400 square meters per gram and having a disordered array of channels of regular diameter in the mesoporous range.

2. A synthetic, semi-crystalline inorganic metal oxide composition prepared by reacting a mixture of a non-ionic poly(alkylene oxide) derived surfactant as a template (N°) and a neutral metal inorganic oxide precursor (I°) in an aqueous hydrolyzing solution followed by addition of fluoride ion to provide the composition as a particulate dispersion which is separated from the solution.

3. The composition of claim 2 wherein the template is removed from the composition.

4. The composition of claim 2 wherein the surfactant has a terminal hydroxyl group.

5. The composition of claim 2 which has the formula:

wherein $A_xO_y$ is written in anyhydrous form wherein R—EO is selected from the group consisting of nonionic alkyl polyethylene oxide, alkyl and aryl polyethylene oxide, and polyethylene oxide-polypropylene oxide-polyethylene oxide block co-polymer molecules and wherein when R—EO is present n is between about 0.01 and 1; A is a metal atom; O is oxygen and x and y are the molar stoichiometries of A and O, such that in the composition when calcined, n is about 0, x is about 1 and y is between about 1 and 3.

6. The composition of claim 2 which has the formula:

wherein $A_vG_wSi_xD_yO_z$ is written in anhydrous form wherein R—EO is selected from the group consisting of nonionic alkyl polyethylene oxide, alkyl and aryl polyethylene oxide and polyethylene oxide-polypropylene oxide-polyethylene oxide block co-polymer molecules and wherein when R—EO is present n is between about 0.01 and 1; A is at least one optional trivalent element selected from the group consisting of Al, Ga and Fe; G is at least one optional tetravalent metallic element selected from the group consisting of Ge, Ti, V, Sb and Zr; Si is silicon; D is optional and is a pentavalent or hexavalent element selected from the group consisting of V, W and Mo; O is oxygen and v, w, x, y and z are the molar stoichiometries of A, B, Si, D and O respectively, wherein in the composition when calcined, n is about 0, $0 \leq v \leq 2$, $0 \leq w \leq 1$, $0.001 \leq x \leq 1$, $0 \leq y \leq 2$ and $2 \leq z \leq 6$.

7. The composition of claim 2 having X-ray diffraction patterns with at least one reflection corresponding to a lattice of between about 3 to 10 nm.

8. The composition of any one of claims 1 or 2 which after calcination, has an $N_2$, $O_2$ or Ar adsorption-desorption isotherm with a step centered at $P/P_0$ between 0.2 and 1.0 and at least one hysteresis loop.

9. The composition of claim 8 wherein a ratio of textural to framework-confined mesoporosity as determined by the $N_2$, $O_2$ or Ar adsorption isotherm, is about less than or equal to about 0.2.

10. The composition of claim 9 wherein the composition has a specific surface area between 300 and 1400 m² per gram.

11. The composition of claim 2 wherein a molar ratio of nonionic surfactant to inorganic oxide precursor in the reaction mixture is between 0.01 and 1.

12. The composition of claim 1 having an X-ray diffraction pattern selected from the group consisting of FIGS. 3, 4 and 5.

13. The composition of claim 1 having an $N_2$ adsorption-desorption isotherms and Horvath-Kawazoe pore size distribution selected from the group consisting of FIGS. 6 and 6A.

14. The composition of claim 2 containing the template.

15. The composition of claim 2 in which the template has been removed by calcination.

16. The composition of claim 2 in which the template has been removed through solvent extraction.

17. The composition of claim 1 having an X-ray diffraction pattern as shown in FIG. 3 as Pathway II.

18. The composition of claim 1 having $N_2$ adsorption-desorption isotherms and Horvath-Kawazoe pore size distribution as shown in FIGS. 7 and 7A.

19. The composition of claim 6 containing the template.

20. The composition of claim 6 in which the template has been removed by calcination.

21. The composition of claim 6 in which the template has been removed through solvent extraction.

22. The composition of any one of claims 1 or 2 in which at least one transition metal is dispersed or impregnated in the channels, selected from the group consisting of Rh, Nb, Re, Ag, Au, Cu, Co, Cr, Ni, Fe, Ir, Mo, Pt, Pd, Sn, Ti, V, W, Zn and Zr.

23. The composition of any one of claims 1 or 2 containing transition metal substituted organic macrocycles in the pores.

24. The composition of any one of claims 1 or 2 wherein the surfaces of the composition have been functionalized by an alkyl metal alkoxide.

25. The composition of any one of claims 2, 3, 4, 5 or 6 wherein the surfaces of the composition upon removal of the template have been functionalized by substitution of the metal alkoxide precursor by a metal carboxylate precursor.

26. The composition of any one of claims 1 or 2 wherein surfaces of the composition have been functionalized by reaction of the composition upon removal of the template and calcination with one or more reagents selected from the group consisting of chlorides, fluorides, sylisation and alkylation reagents.

27. The composition of claim 2 wherein the template ($N°$) is selected from the group consisting of primary, secondary and tertiary fatty alcohol poly(ethoxylates).

28. The composition of claim 2 wherein the nonionic template ($N°$) is an alkyl phenol poly-(ethoxylates).

29. The composition of claim 2 wherein the nonionic template ($N°$) is a fatty acid ethoxylate.

30. The composition of claim 2 wherein the nonionic template ($N°$) is a poly(ethylene oxide-propylene oxide) block co-polymer.

31. The composition of claim 2 wherein the template ($N°$) is selected from the group consisting of primary and secondary fatty amine poly(ethoxylate).

32. The composition of claim 2 wherein the template ($N°$) is a fatty acid poly(ethylene oxide-propylene oxide) block co-polymer.

33. The composition of claim 2 wherein the template ($N°$) is selected from the group consisting of fatty acid alkanolamides and ethoxylates.

34. The composition of claim 2 wherein the template ($N°$) is selected from the group consisting of sorbitan esters and sorbitan ethoxylates.

35. The composition of claim 2 wherein the template ($N°$) is a polyamine propoxylate ethoxylate.

36. A method for the preparation of a synthetic semicrystalline inorganic metal oxide composition which comprises:

(a) providing a mixture of (i) a neutral inorganic oxide precursor ($I°$) containing at least one element selected from the group consisting of di-, tri-, tetra-, penta- and hexavalent elements and mixture thereof; (ii) a nonionic poly(alkylene oxide) surfactant ($S°$) as a template; and (iii) a hydrolyzing agent;

(b) adding a fluoride ion to the mixture in an amount which produces a particulate dispersion of the inorganic oxide precursor and the significant;

(c) separating at least some of the hydrolyzing agent and the surfactant from the particulate dispersion of step (b) to thereby form the inorganic metal oxide composition wherein the composition has a disordered array of channels of regular diameter in the mesoporous range; and (d) optionally calcining the composition.

37. The method of claim 36 wherein the mixture in step (a) is prepared by a random order of addition of the neutral template and neutral inorganic oxide precursor.

38. A method for the preparation of a synthetic, semicrystalline inorganic metal oxide composition which comprises:

(a) preparing a solution of a neutral inorganic oxide precursor ($I°$), containing at least one element selected from the group consisting of di-, tri-, tetra-, penta- and hexavalent elements and mixtures thereof with stirring and optionally aging the inorganic oxide precursor ($I°$) solution;

(b) preparing a homogeneous solution of a nonionic poly(alkylene oxide) surfactant ($S°$) as a template in a hydrolyzing agent, and optionally in a co-solvent, by stirring it at a temperature between about minus 20° and plus 100° C.;

(c) mixing of the solutions of steps (a) and (b) at a temperature between about minus 20° and plus 100° C.;

(d) adding a fluoride ion to the mixture in an amount which produces a particulate dispersion of the inorganic oxide and the surfactant;

(e) separating at least some of the hydrolyzing agent and surfactant from the particulate dispersion of step (d), to thereby form the inorganic metal oxide composition; and (f) optionally calcining the composition, wherein the composition has a disordered array of channels of regular diameter in the mesoporous range.

39. The method of claim 38 wherein the neutral precursor is selected from the group consisting of a metal alkoxide, an inorganic complex, a colloidal inorganic oxide solution, an inorganic oxide sol and mixtures thereof.

40. The method of claim 38 wherein said inorganic oxide precursor solution is mixed without aging.

41. The method of claim 38 wherein the template is separated from the composition and as an additional step recycled after step (e).

42. The method of claim 41 wherein the template is separated by extraction with a solvent selected from the group consisting of a neutral organic solvent, water and mixtures thereof.

43. The method of claim 38 wherein in step (a) the solution aged at a temperature of between 20° to 100° C. for at least 120 minutes.

44. The method of claim 38 wherein the composition is calcined at about 300° to 1000° C. for at least about 30 minutes.

45. A method for the preparation of a crystalline inorganic metal oxide composition which comprises:

(a) preparing a homogeneous solution of nonionic poly (ethylene oxide) surfactant as a template ($N°$) in a lower alkyl alcohol solvent by mixing at ambient temperature;

(b) mixing an inorganic metal precursor to the solution of step (a) at ambient temperature to form a homogeneous solution;

(c) aging the homogeneous solution for between about 10 to 12 hours;

(d) adding a fluoride to the mixture in an amount which produces a dispersion of the inorganic oxide and the surfactant;

(e) aging the dispersions with the fluoride salt;

(g) separating the aqueous solution, lower alkanol and at least some of the template from the dispersion; and (h) drying the dispersion to form the composition, wherein the composition has a disordered array of channels of regular diameter in the mesoporous range.

46. The method of claim 45 wherein the composition is calcined in air.

47. A method for the preparation of synthetic, semi-crystalline inorganic silicon dioxide composition which comprises:

(a) preparing a homogeneous aqueous solution of a non-ionic poly(ethylene oxide) derived surfactant template (N°) with mixing at ambient temperature;

(b) adding an inorganic silica precursor to the solution of step (a) at ambient temperature with stirring to form a mixture which is solid, precipitate;

(c) adding a fluoride ion to the mixture in an amount which produces a particulate dispersion of the silicon dioxide and the surfactant;

(d) separating the aqueous solution and template from the dispersion;

(e) drying the separated dispersion in air at ambient temperature;

(f) calcining the precipitate to remove the template between 673° K and 973° K in air to form the composition, wherein the composition has a disordered array of channels of regular diameter in the mesoporous range.

48. The method of claim 47 wherein the calcining is by combustion in air.

* * * * *

UNITED STATES PATENT AND TRADEMARK OFFICE
CERTIFICATE OF CORRECTION

PATENT NO. : 5,800,799
DATED : September 1, 1998
INVENTOR(S) : Thomas J. Pinnavaia and Eric P. Prouzet It is certified that error appears in the above-identified patent and that said Letters Patent is hereby corrected as shown below:

Column 9, line 23, "$A_vG_wC_xD_yO_z$" should be --$A_vG_wC_xD_yO_z$--.

Column 10, line 17, "products cf" should be --products of--.

Column 10, line 61, "IGELPAL" should be --(IGEPAL-RC)--.

Column 10, line 61, "TRITON-X" should be --(TRITON-X)--.

Column 11, line 15, "TETRONIC" should be --TETRONIC-R--.

Column 13, line 14, "$H_{23-31}$-($CH_2$" should be --$H_{23-31}$-O($CH_2$ --.

Column 14, line 65, "air t 50°" should be --air at 50°--.

Column 15, line 5 (Table 1, last column header), "$(m^2g^{-1}$" should be --$(m^2g^{-1})$--.

Column 15, line 43, "$(m^2g^{-1}$" should be --$(m^2g^{-1})$--.

UNITED STATES PATENT AND TRADEMARK OFFICE
CERTIFICATE OF CORRECTION

PATENT NO.   : 5,800,799
DATED        : September 1, 1998
INVENTOR(S)  : Thomas J. Pinnavaia and Eric P. Prouzet It is certified that error appears in the above-identified patent and that said Letters Patent is hereby corrected as shown below:

Column 15, line 50, "seer there" should be --seen there--.

Column 16, line 37 (Claim 6), "A, B, Si, D" should be --A, G, Si, D--.

Column 19, line 5 (Claim 45), "(g)" should be --(f)--.

Column 19, line 7 (Claim 45, "(h)" should be --(g)--.

Signed and Sealed this

Twenty-seventh Day of April, 1999

Q. TODD DICKINSON

*Attest:*

*Attesting Officer*   Acting Commissioner of Patents and Trademarks